2281X
P. Cooper,
Cradle,
Patented Mar. 27, 1815.
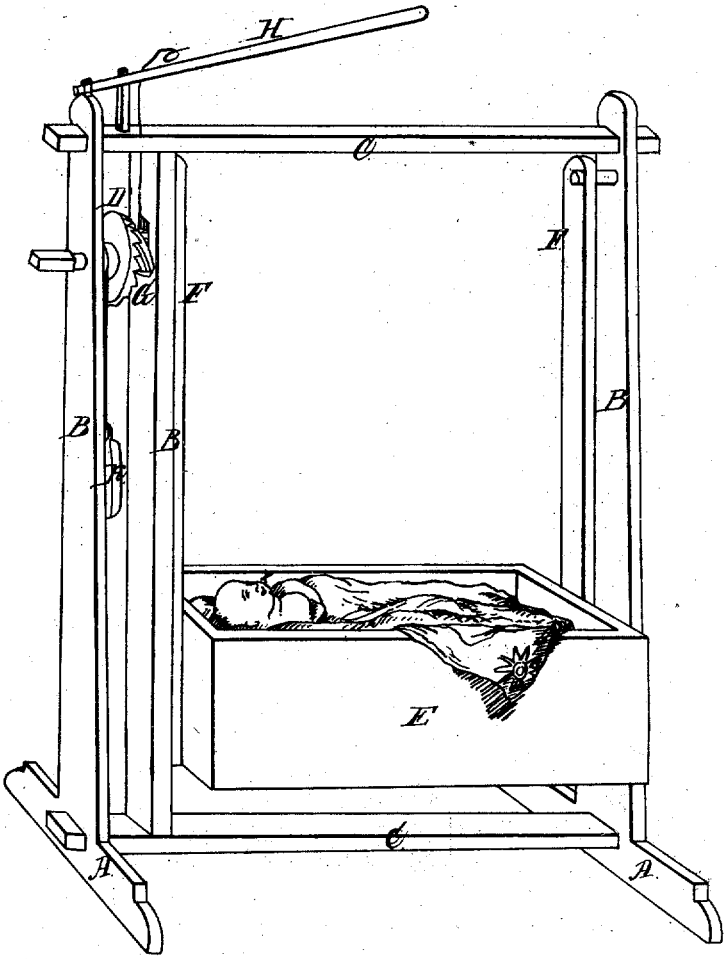
N. PETERS, PHOTO-LITHOGRAPHER, WASHINGTON, D. C.

Mar 27 1815
march
2281X

Peter Cooper

Sellers Patent

The Schedule referred to in these Letters Patent and making part of the same
containing a description in the words of the said Peter Cooper, himself, of his
improvement in the cradle The two [illegible] pieces are made of timber or plank of about two feet and a half long &
four inches broad & one inch & half thick which are made to support the whole
machinery perpendicular in the centre of each of them standeth a post of about
four feet and half high eight inches wide at the bottom and three inches at
the top & one inch thick which are connected together at the top and bottom
by two bars the bar is three feet nine inches from inside to inside of the frame
and is six inches broad & one inch thick and has a tenant upon each end
of it which passes through the posts and is pinned upon the outside of the said
posts the bar is one inch and half broad & the same length and thickness as
the [illegible] & may be fastened in a similar way. Another post is placed with its
foot resting on the lower bar and its top fast to the upper at about seven
inches from one of the two posts first mentioned; between these two posts last
spoken of is a crown wheel similar to that in a clock the axis of which rests
& is made to turn in the said posts at about one foot from the top the wheel
being next to the inner post and the outer end of it furnished with a crank
either moveable or fastened on it for the purpose of winding up the machine
as hereafter directed between this intermediate post and the one at the other
end of the frame is hung a receptacle for the child which may be called
a cradle, is being of dimensions and form adapted to fancy and convenience
the bottom of this cradle is near the top of the lower cross bar and is suspended
by two small strips of wood of one inch and a quarter square one fastened
at each end of it and reaching nearly to the top of the frame where they
are made to hang in or upon the said posts by means of two small wires
turned at right angles the one next to the crown wheel extending through
the post and having a pallet like that of a clock working in the said

2281X

Crown wheel; a weight of sufficient gravity being ~~then~~ suspended by a cord wound up upon the axis of the wheel and the cradle being then put in motion it will Vibrate like the pendulum of a clock untill the weight be run down. In order to winding up the machinery after being run down it is only necessary to turn the crank of the wheel to [illegible] up on its axis with a catch or if the wheel be fast upon its axis the pallet may be elevated and disengaged from the wheel while winding up by means of a lever placed on the top of the machine and made to lift up that end of the cradle by a wire passing from the lever down through the upper cross bar and around the axis of the pallet -

The principal claim to a patent right consists in giving motion to a cradle by means of Weight Crown Wheel and pallet Peter Cooper Witnesses

[illegible] Conover

Benjamin Bedell

615 [illegible]

Drawing made from description

L.f.W.